Dec. 12, 1961  J. H. BERTIN ET AL  3,012,738
AIR-BORNE VEHICLE
Filed June 25, 1957  5 Sheets-Sheet 2
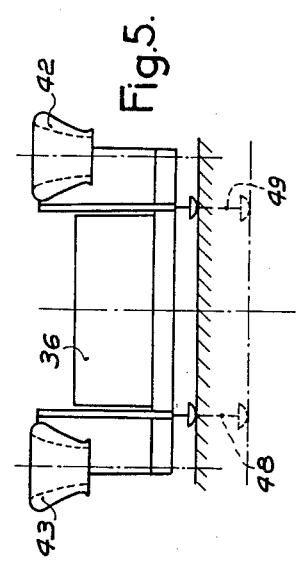
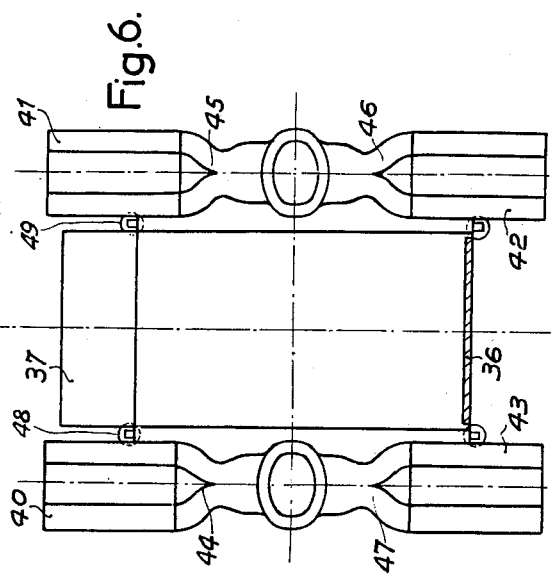
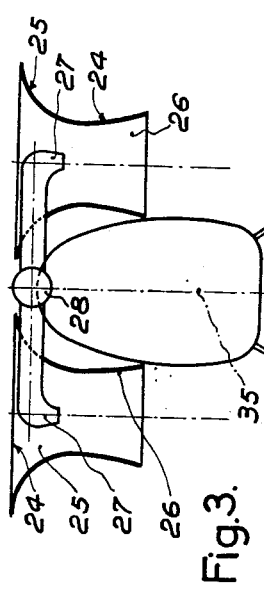
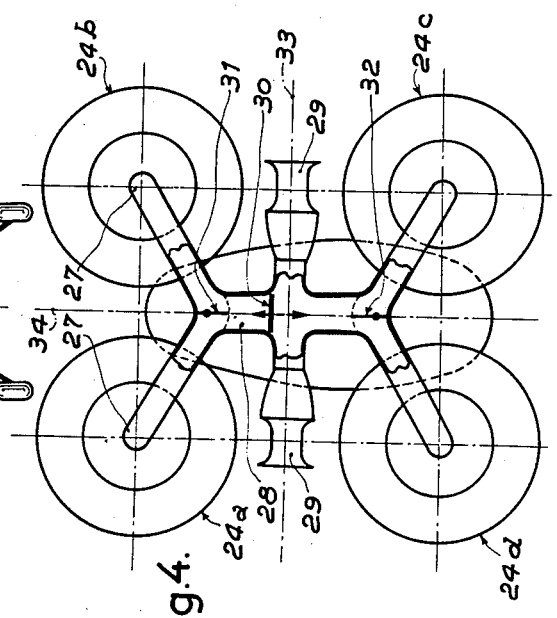
INVENTORS
Jean H. Bertin
Henri F. Schmitt
By
Watson, Cole, Grindle & Watson
ATTORNEYS

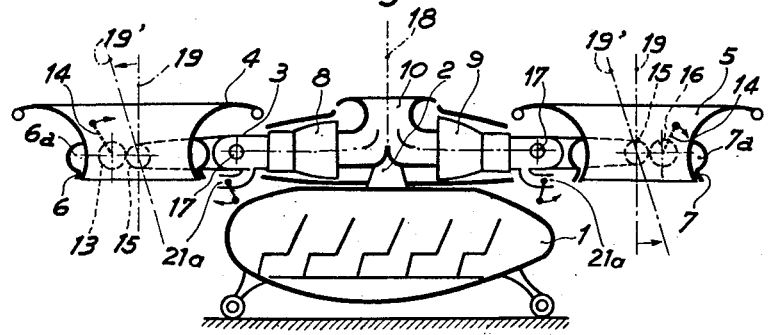
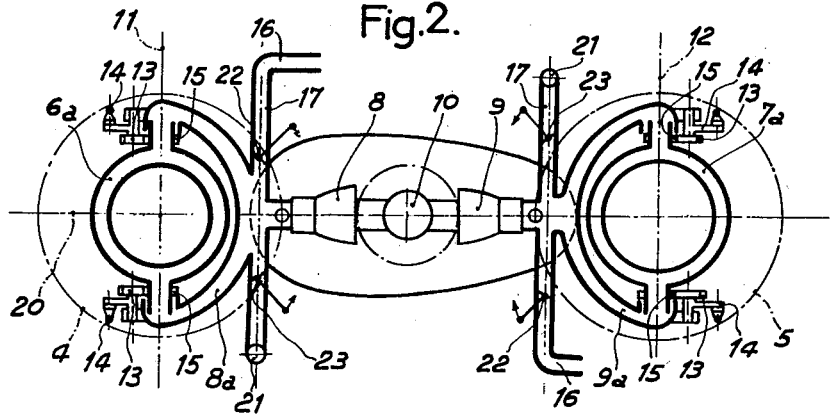

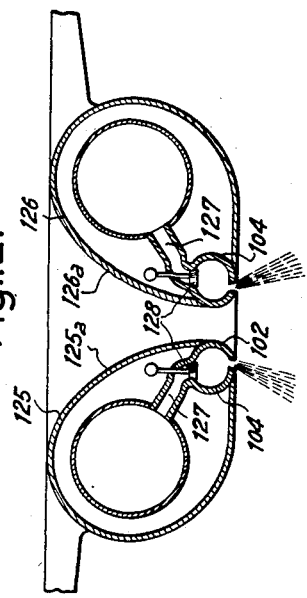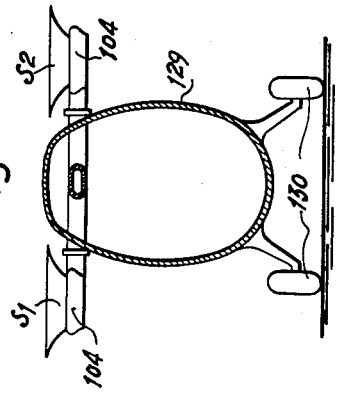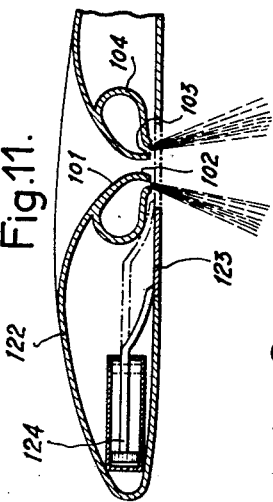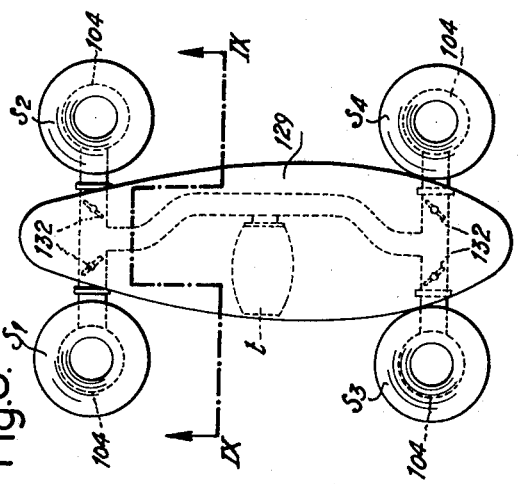

Dec. 12, 1961     J. H. BERTIN ET AL     3,012,738
AIR-BORNE VEHICLE

Filed June 25, 1957     5 Sheets-Sheet 5

INVENTORS
Jean H. Bertin
Henri F. Schmitt
By Watson, Cole, Grindle & Watson
ATTORNEYS

United States Patent Office 3,012,738
Patented Dec. 12, 1961

3,012,738
AIR-BORNE VEHICLE
Jean Henri Bertin, Neuilly-sur-Seine, and Henri Francois Schmitt, Bourg la Reine, France, assignors to Societe Bertin & Cie, Seine, France, a French company
Filed June 25, 1957, Ser. No. 667,830
Claims priority, application France June 25, 1956
2 Claims. (Cl. 244—12)

It is known to obtain the lift of an aircraft by using reaction jets directed downward, and the resultant thrust of which is substantially equal to the weight of the machine.

In addition, simple devices known as ejectors are also well known, which play the part of a compressor or ventilator, receiving the energy of an inducing jet of air or gas at high pressure and small rate of flow and transmitting this energy to a large induced flow of air at low pressure.

Attempts have also been made to increase the propulsive thrust of a reaction motor by means of ejectors. Whatever type of ejector is employed however, it has been found that the improvement obtained becomes negligibly small or is even converted to a loss, as soon as the speed of motion of the moving machine becomes great.

The invention has for its object an aircraft, and more particularly an aircraft adapted to take-off and land vertically, the effort of lift for which is ensured wholly or in part by ejectors suitably arranged with respect to the centre of gravity of the said aircraft.

These ejectors may be supplied by the exhaust jet provided by one or a number of gas turbines.

As the speed of the aircraft in the vertical direction, known as the "speed of ascension" remains very small and generally negligibly small as compared with the speeds of the air-flow induced in the ejectors, the latter give a substantial useful effect, even if their efficiency is not very high. Thus, any increase in the lift, account being taken of the weight of the ejector, which is generally small, results in a corresponding increase in the useful load or in the duration of flight. As the net resultant of weight of direct-reaction lift devices always corresponds to a useful load which is extremely small as compared with the weight of the whole unit, it will be understood that any increase, however small, of the lift thrust provides a considerable and surprising increase of the proportion of the useful load in the total balance sheet, and thus of the commercial efficiency of the machine.

If for example the useful load were 5% of the total weight before the application of the ejectors, and if the latter after deduction of their own weight, produce an increase in thrust of 10%, it can be seen that the useful load is tripled whilst the total weight is only increased by the weight of the ejectors which are simple, fairly light and cheap devices.

Forms of embodiment of the invention will be described below by way of examples with reference to to the accompanying drawings, but it is clearly understood that the present invention is in no way limited to these examples and includes in its scope any arrangement adapted to ensure the lift of an aircraft by means of ejectors.

In the drawings:

FIG. 1 is a diagrammatic view in elevation of an aircraft equipped with a lift device comprising ejectors.

FIG. 2 is a plan view of the said aircraft.

FIGS. 3–4 and 5–6 are views similar to those of FIGS. 1 and 2, showing two alternative forms of construction.

FIGS. 8 and 9 show in plan and in cross-section along the line IX—IX, an alternative form of embodiment of the air-borne vehicle.

FIGS. 11 and 12 are cross-sections illustrating the assembly of an ejector lift device in a wing or a fuselage.

Figure 7:
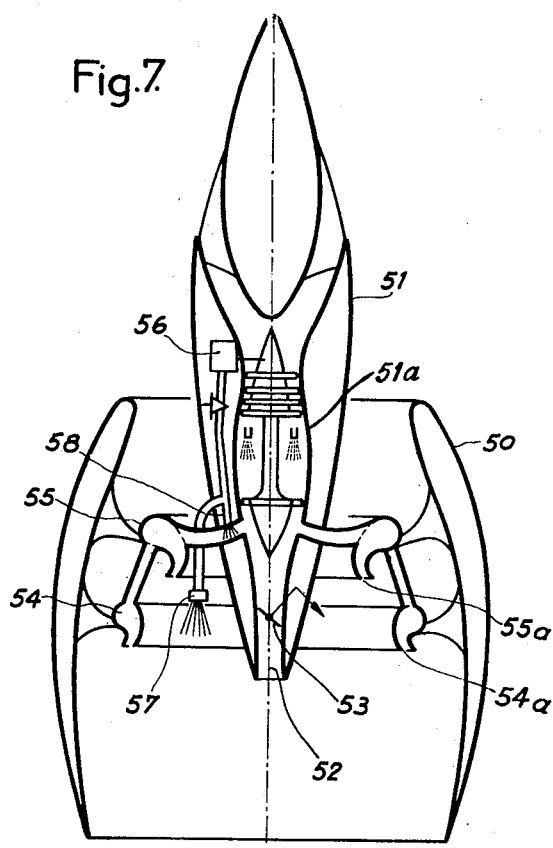
FIG. 7 shows in cross-section a machine for vertical flight.

The aircraft shown diagrammatically by way of example in FIGS. 1 and 2, comprises a cabin 1 on the top of which is mounted a pillar 2 to which is fixed a long arm or support 3 arranged parallel to the longitudinal axis 20 of the aircraft, At the extremities of this support are mounted two annular ejectors 4 and 5, the outlet orifice of which is directed downwards and is surrounded by an annular nozzle 6 and 7. These nozzles produce the inducing jet in the form of a screen constituting a divergent with a fluid wall which forms an extension of the solid-wall convergent of the ejector.

The propulsive fluid supplied to the collectors 6a and 7a which feed the annular slots 6 and 7 may be provided from any adequate source. In the example shown in the drawing, there has been shown a particularly advantageous form of gas generator comprising two turbo-jet units 8 and 9 mounted on the support 3 symmetrically with respect to the vertical axis 18 passing through the pillar 2. These turbo-jet units have a common air intake 10 centered on the axis 18 and opening upwards, in order to assist, by the effect of suction, in the lift force applied to the aircraft. The exhaust of the turbo-jet units is connected to the annular collectors 6a and 7a by means of conduits 8a and 9a terminating at the opposite extremities of a diameter of these collectors which passes through the transverse axes 11 and 12; the junction of the conduits 8a and 9a to the collectors 6a and 7a being effected by means of rotary joints, as shown in FIG. 2.

This arrangement is intended to enable the ejectors 4 and 5 to pivot about the transverse axes 11 and 12, their inclination being variable by means of a toothed pinion or segment 13, rigidly fixed to a lever 14 and engaging with a further toothed pinion or segment 15 fixed on the pivotal axis of the ejectors 4 and 5. A kinematic or other coupling permits of conjoint control by the pilot of the levers 14 of each ejector, this coupling being such that the parallelism of the axes of the ejectors is maintained whatever their inclination may be.

In addition to the conduits 8a and 9a supplying the inducing jets of the ejectors, two transverse conduits 17, 17 are connected to the exhaust of the turbo-jet units. These transverse conduits terminate in auxiliary discharge nozzles 16, 16 on the one hand and 21, 21 on the other hand, which are symmetrical with respect to the vertical axis 18 of the aircraft. The auxiliary discharge nozzles 16, 16 are orientated in the horizontal plane and are directed towards the rear, while the auxiliary discharge nozzles 21, 21 are orientated in the vertical plane and are directed downwards.

The discharge nozzles 16—16 are controlled by means of valves 22, 22 arranged to move in reverse directions, one opening when the other is closed, the total flow remaining substantially unchanged. In the same way, the auxiliary discharge nozzles 21, 21 are associated with valves 23, 23 with opposite movements and also ensuring a constant rate of flow.

In addition, the variable discharge nozzles 21a are mounted on the exhaust system of each turbo-jet unit.

The apparatus which has just been described operates in the following manner:

In the case of taking-off and landing vertically, or again during stationary flight, the ejectors 4 and 5 are directed in such manner that their axes are vertical, as shown at 19, 19 in FIG. 1. The turbo-jet units 8 and 9 supply the propulsive gases which serve to produce the inducing jets of the ejectors which draw-in air through their upper opening and discharge it downwards with an increased speed by reason of the energy transmitted to the mass of air by the inducing jets. The thrust which results, and which is directed upwards, provides the lift for the aircraft and eventually its movements in the vertical plane.

Propulsion in the horizontal plane is provided by giving the ejectors 4 and 5 a certain inclination towards the front, their axes then being brought into the position shown at 19', 19'. The thrust generated by the inclined ejectors is then composed of a vertical component directed upwards and serving to provide the lift of the aircraft, and a horizontal component directed forwards and providing the propulsion.

The directional control of the aircraft, that is to say its rotation about the vertical axis 18, is effected by means of the auxiliary discharge-nozzle 16, 16 by operating their valves 22, 22 so as to produce a differential couple about the said axis 18, in one direction or the other.

In a similar manner, the stability about the rolling axis 20 of the aircraft is obtained by the auxiliary discharge nozzles 21, 21 by acting in the suitable sense on their valves 23, 23 so as to produce the desired couple about the axis 20.

It will be observed that these auxiliary discharge nozzles are arranged symmetrically in pairs with respect to the centre of gravity of the machine, and are designed to give always a constant total thrust, so that the lift of the apparatus is not effected by their relative variations.

The discharge nozzles 21a enable the stability of the aircraft to be varied about its pitching axis by reducing the lifting effect of one or the other of the ejectors. They also enable the lift force produced by the ejectors to be regulated with greater precision and rapidity than by acting on the conditions of operation of the reactors, in particular at the moment of landing, since, by discharging through these discharge-nozzles a greater or less quantity of the flow of gas supplied by the reactors, the supply to the ejectors can be modified.

In addition, in order to avoid the creation of gyroscopic disturbing couples due to the rotating parts of the turbo-jet units 8 and 9, identical motors will preferably be employed and they will rotate in opposite directions.

FIGS. 3 and 4 show an air-borne vehicle equipped with four vertical fixed ejectors 24. These ejectors, formed by convergents 25 and divergents 26, are supplied by axial inducing jets 27, coupled to a collector 28 into which the turbo-jet units or gas turbines 29 discharge. The ejectors have their axes vertical and are symmetrically arranged with respect to the vertical axis 35, passing through the centre of gravity of the aircraft.

The collector 28 is provided with a system of three valves: a valve 30 enabling the rate of flow of propulsive fluid supplied to the ejectors 24a and 24b on the one hand and 24c and 24d on the other hand to be varied; a valve 31 controlling the respective rates of flow of propulsive fluid supplied to the ejectors 24a and 24b; and finally a valve 32 controlling the respective rates of flow of the ejectors 24c and 24d.

The equilibrium and maneuvering of the aircraft are effected by the regulation of these three valves. Thus, a nose-up or diving movement about the transverse axis 33 will be obtained by means of the valve 30, the valves 31 and 32 remaining in their central positions.

In the closed position of the valve 30 as shown in the drawing, the ejectors 24c and 24d alone being supplied tend to lift and produce a nose-up movement of the machine. A rolling couple about the longitudinal axis 34 will be produced by leaving the valve 30 in the open position, while acting simultaneously on the valves 31 and 32 in order to supply the ejectors located on the same side of the axis 34 (for example the ejectors 24a and 24d) while not supplying the ejectors located on the opposite side (for example 24b and 24c).

It is to be noted that by causing a number of gas turbines 29 to deliver into a common collector 28 to supply the ejectors, the safety margin is improved in the event of failure of one of the turbines.

FIGS. 5 and 6 show an aircraft similar to that previously described, but serving as a lifting device or carrying platform. This aircraft is lifted by four lateral rectangular ejectors 40, 41, 42 and 43, of the fluid-screen type supplied by induction jets discharged from gas turbines 44, 45, 46 and 47.

The landing legs 48 and 49 of the device are made telescopic in order that it may descend on the ground with the object of facilitating the loading of ground vehicles to be transported, the sloping loading platforms 36 and 37 being lifted to close the platform at the front and at the rear.

Finally, FIG. 7 shows in cross-section an apparatus adapted to take-off vertically, equipped with an ejector propulsion system. The fuselage 51 contains a turbo-jet unit 51a, the discharge-nozzle 52 of which may be closed to a greater or less extent by means of a valve 53 so as to send all or part of the gas into the collectors 54 and 55 supplying the annular slots 54a and 55a which produce fluid divergents. The whole assembly is surrounded by an annular wing 50 which can form a ram-jet unit in the case especially of flight at high speed. The fuel is in this case supplied by a pump 56 and is distributed either into the fluid screens themselves by means of the injector 58 discharging into the supply conduit of the collector 55, or by injectors 57 discharging into the ram-jet unit. For the take-off, there is thus provided a powerful thrust with a low specific consumption, by means of the ejectors, and then by igniting the ram-jet unit all the desired speeds of flight can be attained.

The air-borne vehicle shown in FIGS. 8 and 9 comprises four lifting ejectors S1, S2, S3 and S4 of the divergent fluid screen type, arranged along the summits of a rectangle or a square on a chassis 129, which is shown in the drawings provided with wheels or skids 130 for resting on the ground before taking-off, the said devices S1, S2, S3 and S4 having vertical axes and convergents directed towards the ground as shown in FIG. 9.

The gas under pressure which serves to supply the collectors 104 of the said ejectors and their nozzles 103 in the form of a slot, which create the divergent fluid screens, may be produced in any desired manner, for example by a chemical reaction or again by a gas-turbine installation shown diagrammatically at $t$ and comprising an air compressor, combustion chambers and a turbine for driving the compressor. The gases passing out of this turbine which still possess a substantial energy are very well suited for supplying the collectors 104 and forming the divergent fluid screens. Regulating valves 132, shown in the drawing in the form of butterfly valves, enable the rates of flow of gas sent to the various collectors 104 to be individually regulated and in consequence the trim of the whole assembly is also adjusted thereby. The lifting devices S1, S2, S3 and S4 can be pivotally mounted on the chassis 129 in order to permit of the creation of horizontal components of the thrust so as to obtain any desired movement when the machine has once taken-off from the ground. For example, each of the lifting devices may be designed for mounting on the chassis 129 by a Cardan joint in order that it may be possible to give them any inclination which is desired.

The movement of the fluid induced in the lifting devices may be accelerated of course by various means, for example by means of a small propeller driven by an auxiliary motor and mounted at the intake of each of the convergents.

Figure 10:
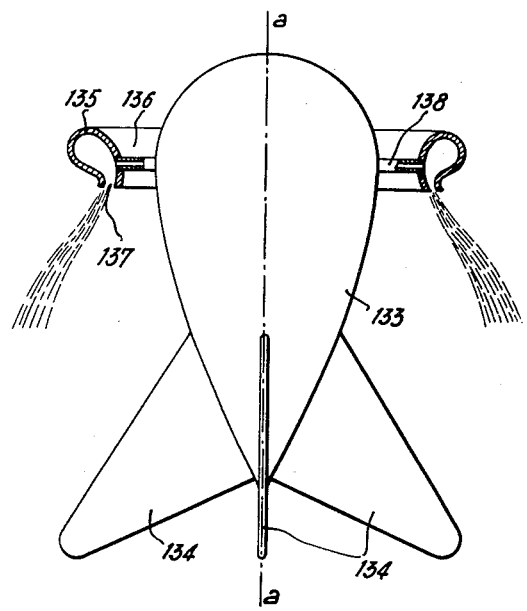
FIG. 10 shows a further alternative form.

The air-borne vehicle shown in FIG. 10 comprises a body 133 of rounded form, which may or may not be a body of revolution about an axis $a$—$a$. Around this body, the tail of which can be provided with control flaps 134, is mounted a ring 135 forming an annular convergent 136 between itself and the body 133. This ring is hollow and its interior may be supplied with a fluid under pressure which escapes through the annular slot 137 so as to form the external surface of an annular divergent fluid screen, the internal surface of this annular divergent being formed by the streamlined body 133. As in the previous cases, the supply of fluid under pressure to the ring 135 may be obtained from any generator contained in the body 133, the gas under pressure being sent through hollow arms 138 into the interior of the ring 135.

An aircraft of this kind can take-off vertically. After taking-off, the control flaps enable it to be placed in horizontal flight, the ring 135 and the associated members then playing the part of a propulsion unit. The said ring may be shaped so as to produce a lifting effect in the same way as an annular wing.

The ejector lifting devices may be incorporated in a wing system or in a fuselage.

FIGS. 11 and 12 show two further alternative forms of embodiment. In the case illustrated in FIG. 11, the lifting device is incorporated in a wing. There can be seen at 101 the convergent of the lift device, the inlet orifice of which opens on the extrados 122 of the wing and the neck opens on to the intrados. When the lift device is not in action, that is to say when for example the speed of the aircraft is sufficient for no supplementary lifting force to be required, the orifice of the neck may be closed and the continuity of the intrados can be restored by means of a sliding plate 123 actuated by a jack 124. In FIG. 11, this plate 123 is shown in the position in which it leaves open the neck 102 and in which the annular collector 104 is supplied with fluid under pressure to produce the fluid screen through the annular slot 103 surrounding the neck 102. The position in which the plate 123 closes the neck is shown in chain-dotted lines. The neck 102 may have a circular shape or the form of a slot extending into the wing parallel to its length.

In the form of embodiment shown in FIG. 12, the space between the fuselages 125 and 126, which each contain a reaction propulsion unit, is arranged so as to form the lift device. To this end, these fuselages are de-limited on the side of this space by two surfaces 125a and 126a forming a convergent which opens towards the underside of the aircraft through the rectangular neck 102, the larger dimension of which extends at right angles to the plane of FIG. 12. The collector 104 (or rather the two branches of the collector) is located along the two opposite longer sides of this neck is supplied, at the moment when it is desired to put the lift device into operation, by gases obtained from the two reactors, for example on the downstream side of the delivery of the turbine, before the final expansion nozzle, or again on the combustion chambers. This supply is obtained through piping systems 127 provided with valves 128. The convergent formed between the surfaces 125a and 126a must be limited of course at its two extremities.

For that purpose, plates may be provided parallel to the plane of FIG. 12.

In order to increase the rate of flow of gas supplying the collector 104 with a view to forming the fluid screen, devices may be provided on the reactors which enable the section of the discharge nozzles of these reactors to be reduced or even to be completely closed.

Figure 13:
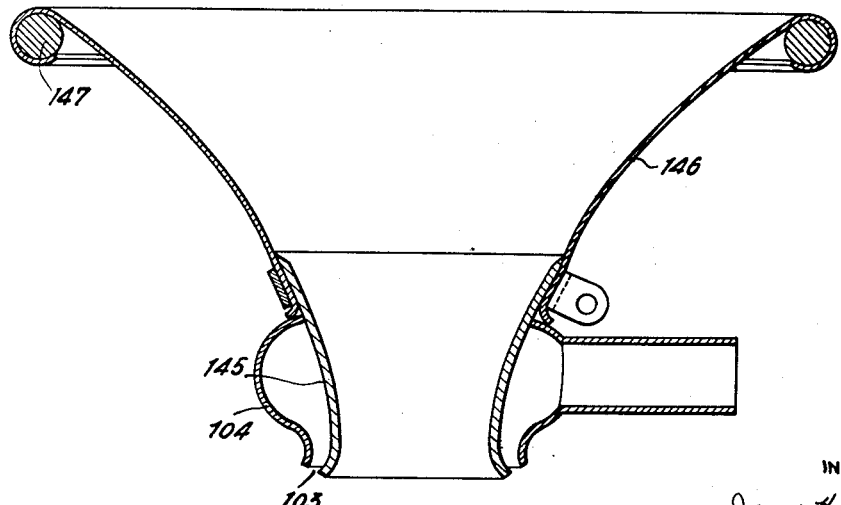
FIG. 13 shows in axial cross-section the construction of a light ejector with a divergent fluid screen.

The convergents of the ejectors are subjected to an internal depression. The curvature of these convergents, with a convex portion on the side of the depression, favours the stability of their shape. They can thus be constructed in a light manner, which is an advantage in the application considered. They can even be constructed, at least in part, of flexible material for example, of fabric or films of plastic material. This is shown in FIG. 13, which is the cross-section of a machine in which the adjacent part of the neck 145, which is subjected to the greatest depressions, is of sheet steel and is extended by a strong impermeable canvas stiffened at its largest diameter by a ring 147 on which it is fixed. The ring 147 is not necessarily rigidly fixed with respect to the part 145, since the tension of the canvas due to the effect of the pressure forces is sufficient to maintain it in stable equilibrium.

What we claim is:

1. A vertical take-off and landing aircraft comprising a central fuselage, a gas-turbine engine housed in said fuselage, an annular airfoil extending around said fuselage in substantially coaxial relation therewith and defining with said fuselage a streamlined air passage open at both ends, the axis of said passage being substantially vertical when the aircraft rests on the ground in the take-off attitude, and annular slot-like nozzle extending around said fuselage within said annular airfoil in substantially coaxial relation therewith, said nozzle facing downwardly toward the ground when the aircraft is in said attitude, and piping means extending from said gas-turbine engine in said fuselage to said nozzle outside the same for supplying said nozzle with motive gas from said engine, whereby a descending air flow is induced through said annular airfoil.

2. Aircraft as claimed in claim 1, comprising further fuel injecting means in the piping means for adding fuel to the motive gas supplied to the annular nozzle.

References Cited in the file of this patent

UNITED STATES PATENTS

| | | |
|---|---|---|
| 2,377,835 | Weygers | June 5, 1945 |
| 2,451,008 | Williams | Oct. 12, 1948 |
| 2,601,104 | Douglas | June 17, 1952 |
| 2,907,536 | Von Zborowski | Oct. 6, 1959 |
| 2,922,277 | Bertin | Jan. 26, 1960 |
| 2,933,266 | Van Zborowski | Apr. 19, 1960 |

FOREIGN PATENTS

| | | |
|---|---|---|
| 805,817 | France | Sept. 7, 1936 |
| 441,415 | Italy | Nov. 2, 1948 |
| 522,266 | Canada | Mar. 6, 1956 |
| 1,025,731 | Germany | Mar. 6, 1958 |